United States Patent
Harel et al.

(10) Patent No.: US 7,949,069 B2
(45) Date of Patent: May 24, 2011

(54) METHOD, SYSTEM AND APPARATUS FOR APPLYING HYBRID ARQ TO THE CONTROL OF TRANSMIT DIVERSITY

(75) Inventors: Haim Harel, New York, NY (US); Yair Karmi, Bridgewater, NJ (US); Wei Sun, Hillsborough, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 795 days.

(21) Appl. No.: 11/976,722

(22) Filed: Oct. 26, 2007

(65) Prior Publication Data
US 2008/0123768 A1 May 29, 2008

Related U.S. Application Data (60) Provisional application No. 60/854,430, filed on Oct. 26, 2006.

(51) Int. Cl.
*H04K 1/02* (2006.01)

(52) U.S. Cl. ........ 375/296; 375/267; 375/130; 375/146; 375/299; 370/329; 370/207; 370/215; 370/333; 370/334; 455/138; 455/101; 455/69

(58) Field of Classification Search .......... 375/267, 375/130, 296, 67, 146, 299; 370/329, 207, 370/215, 333, 334; 455/138, 101, 69
See application file for complete search history.

(56) References Cited

U.S. PATENT DOCUMENTS

| | | | |
|---|---|---|---|
| 5,642,353 | A | 6/1997 | Roy, III et al. |
| 5,832,044 | A | 11/1998 | Sousa et al. |
| 5,991,330 | A | 11/1999 | Dahlman et al. |
| 5,999,826 | A | 12/1999 | Whinnett |
| 6,185,440 | B1 | 2/2001 | Barratt et al. |
| 6,226,509 | B1 | 5/2001 | Mole et al. |
| 6,236,363 | B1 | 5/2001 | Robbins et al. |

(Continued)

FOREIGN PATENT DOCUMENTS

EP 0 986 193 3/2000

(Continued)

OTHER PUBLICATIONS

U.S. Appl. No. 11/228,428, filed Sep. 15, 2005, Karmi.

(Continued)

*Primary Examiner* — Eva Y Puente
(74) *Attorney, Agent, or Firm* — Pearl Cohen Zedek Latzer, LLP (57) ABSTRACT

A method, system and apparatus using hybrid automatic repeat-request (HARQ) to enhance a system throughput in a transmit diversity system. Embodiments of the present invention may include a method including receiving a quality-indication signal such as a HARQ from the base station, calculating a complex weighting based on the quality-indication signal, modifying a pre-transmission signal based on the complex weighting to produce a plurality of modified pre-transmission signals, each modified pre-transmission signal from the plurality modified pre-transmission signals being uniquely associated with an antenna element from a plurality antenna elements of a mobile device, and sending the plurality of modified pre-transmission signals from the plurality of antenna elements to produce an effective combined transmitted signal, the complex weighting being associated with a total power of the transmitted signal and at least one from a phase rotation and a power ratio associated with each antenna element from the plurality of antenna elements.

6 Claims, 4 Drawing Sheets

U.S. PATENT DOCUMENTS

| | | |
|---|---|---|
| 6,330,294 B1 | 12/2001 | Ansbro et al. |
| 6,343,218 B1 | 1/2002 | Kaneda et al. |
| 6,392,988 B1 | 5/2002 | Allpress et al. |
| 6,492,942 B1 | 12/2002 | Kezys |
| 6,636,495 B1 | 10/2003 | Tangemann |
| 6,704,370 B1 | 3/2004 | Chheda et al. |
| 6,745,009 B2 | 6/2004 | Raghothaman |
| 6,754,473 B1 * | 6/2004 | Choi et al. .................... 455/101 |
| 6,810,264 B1 | 10/2004 | Park et al. |
| 6,859,643 B1 | 2/2005 | Ma et al. |
| 6,882,228 B2 | 4/2005 | Rofougaran |
| 7,272,359 B2 | 9/2007 | Li et al. |
| 7,298,717 B2 * | 11/2007 | Hui et al. ..................... 370/329 |
| 2002/0012380 A1 * | 1/2002 | Hottinen et al. ............. 375/138 |
| 2002/0098815 A1 * | 7/2002 | Hattori et al. ................ 455/138 |
| 2003/0002594 A1 | 1/2003 | Harel et al. |
| 2003/0112880 A1 | 6/2003 | Walton et al. |
| 2004/0048584 A1 | 3/2004 | Vaidyanathan et al. |
| 2004/0085239 A1 | 5/2004 | Ukena et al. |
| 2005/0031050 A1 * | 2/2005 | Kim et al. .................... 375/267 |
| 2005/0059355 A1 | 3/2005 | Liu |
| 2005/0130597 A1 | 6/2005 | Li et al. |
| 2005/0143113 A1 | 6/2005 | Lee et al. |
| 2005/0219999 A1 * | 10/2005 | Kim et al. .................... 370/207 |
| 2006/0267983 A1 | 11/2006 | Karmi et al. |
| 2006/0270359 A1 | 11/2006 | Karmi et al. |
| 2007/0081607 A1 | 4/2007 | Kludt et al. |
| 2008/0108310 A1 * | 5/2008 | Tong et al. ..................... 455/69 |
| 2008/0298317 A1 * | 12/2008 | Yang et al. .................... 370/329 |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

* cited by examiner

METHOD, SYSTEM AND APPARATUS FOR APPLYING HYBRID ARQ TO THE CONTROL OF TRANSMIT DIVERSITY

CROSS-REFERENCE TO RELATED APPLICATIONS

The present application claims benefit of prior filed U.S. Provisional Patent Application Ser. No. 60/854,430, entitled METHOD, SYSTEM AND APPARATUS FOR APPLYING HYBRID ARQ TO THE CONTROL OF TRANSMIT DIVERSITY, filed Oct. 26, 2006.

FIELD OF THE INVENTION

The present invention relates generally to control of transmit diversity (TxDiv) in wireless systems, and in particular to transmit diversity systems that use hybrid automatic repeat-request (HARQ), such as for example, EvDO Rev A, W-CDMA HSDPA (Rel 5) or HSUPA (Rel 6).

BACKGROUND OF THE INVENTION

Sufficient quality between a base station and a mobile user may usually be achieved by increasing a transmission power. However, higher power may increase an overall noise level, which may effectively reduce system capacity, per base station coverage and throughput. Service time of mobile units may also be reduced due to higher battery drain.

Transmit diversity may provide multiple solutions by transmission from more than one antenna, particularly at a mobile communication device. Transmission from multiple antennas may be selective where only one antenna may be active at any time, or may be combined, with a simultaneous transmission from multiple antennas. In order for transmit diversity to be effective, transmission from multiple antennas may require control of parameters of signals that may be fed to these antennas, and may be designated diversity parameters. This control may depend on a type of transmit diversity that may be applied.

Some solutions that may control transmit diversity may include a diversity control that may be based on a channel modeling. This channel modeling may be based on feedback that may be provided by a receiving end, or an estimation of a transmission channel at the transmitting device, from reception of an opposite channel. Other solutions may be by blind diversity control, such as Space Time Coding (STC). Other solutions may be by a power control feedback based transmit diversity.

These solutions may have drawbacks, which may include requiring changes to an air interface standard, as is the case for STC, or performance limitations.

SUMMARY OF EMBODIMENTS OF THE INVENTION

Embodiments of the present invention may allow for improvement of transmit diversity control in a system that may use hybrid automatic repeat-request (HARQ) to enhance a system throughput, that may require less repetitions or may support a higher data rate and a larger packets that may be more efficient. Embodiments of the present invention may allow for improvement of power consumption at a transmitting communication device by lowering power that may be needed to transmit signals. Embodiments of the present invention may allow for improvement of a wireless communication system capacity by reducing interference among wireless communication users. Embodiments of the present invention may allow for improvement of transmission efficiency by fading mitigation and beamforming.

Embodiments of the present invention may include a method for a first communication device, e.g., a mobile communication device, to communicate with a second communication device, e.g., a base station, over a wireless communication link, the first communication device having a plurality of antenna elements, the method comprising: receiving a quality-indication signal from the second communication device; calculating a complex weighting based on the quality-indication signal; modifying a pre-transmission signal based on the complex weighting to produce a plurality of modified pre-transmission signals, each modified pre-transmission signal from the plurality modified pre-transmission signals being uniquely associated with an antenna element from a plurality antenna elements; and sending the plurality of modified pre-transmission signals from the plurality of antenna elements to produce an effective combined transmitted signal, the complex weighting being associated with a total power of the transmitted signal and at least one from a phase rotation and a power ratio associated with each antenna element from the plurality of antenna elements.

In embodiments of the invention, the one or more quality indicators at the first communication device may include at least one HARQ, or information derived from at least one HARQ.

In embodiments of the invention, at least one of the first or second communication devices may also implement receive diversity.

Embodiments of the invention may provide for improved performance, measured, for example, in terms of (i) less power the unit is required to transmit for the receiver to receive acceptable signal quality, (ii) a lower number of errors in the transmission, (iii) higher throughput, and (iv) improved geographical coverage.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The invention may include a hybrid automatic repeat-request (HARQ) feedback in transmit diversity control logic. By a transmit diversity device or system, it is generally meant a device or system in which a transmitter has a plurality of antenna elements each simultaneously transmitting the same signal, wherein the transmission parameters of the different antennae, for example, phase and/or power, may be different from each other and independently controlled.

HARQ is a variation of the ARQ error control method. In standard ARQ error-detection information (ED) bits are added to data to be transmitted, for example, cyclic redundancy check (CRC). In Hybrid ARQ, forward error correction (FEC) bits may also be added to the existing ED bits, e.g., Turbo code or Reed-Solomon code. The present invention may use Type I or Type II HARQ, as appropriate, as a quality indication signal and adjust transmit diversity parameters accordingly.

An example of an application of the present invention may consist of a wireless communication system with a transmitting communication device, a receiving communication device, and a communication medium between them, for example, a wireless communication channel, such that a transmitting and a receiving device may communicate via the wireless medium once a connection is established.

Transmit diversity control logic, which may reside, for example, in a diversity control device at a mobile transmitting communication device, may use parameters that may be locally available or may use measurements and/or feedback received from a receiving base station communication device, and may determine one or more adjustments that may be made on hardware of a transmitting communication device. An adjustment may be made by an application of an array of diversity control parameters to a diversity control module of a transmitting device, which may include one or more of a phase control unit or an amplitude control unit, or both, for producing complex weights. Diversity control parameters may be generated by a diversity control module that may use measurements and feedbacks, for example, received from the receiving communication device.

HARQ is a feedback mechanism where error control bits, in the form of repetitions or additional error correction or both, are only transmitted if the receiver did not succeed in decoding a packet of information. Therefore a receiving communication device may send to a transmitting communication device the HARQ feedback indicating whether or not a packet of information sent by a transmitting communication device may have been successfully received, and the transmitter will transmit additional information on the packet or proceed to transmission of the next packet based on this feedback. Information or signals may be transmitted by a transmitting communication device after applying diversity control parameters to a transmitting communication device's hardware that may alter certain characteristics of a signal. Characteristics that may be altered may include a signal's amplitude, phase, or both. Embodiments of the invention may take into account HARQ information when diversity control parameters are generated.

In some embodiments of the present invention, in addition to or independently of the general and/or original purpose of the HARQ protocol, HARQ information may be used as an indicator of quality of a channel in which communication devices may operate. As a channel quality may improve due to a transmit diversity control, a transmitting communication device may increase an amount of information that may be transmitted without sacrificing quality of a communication between it and a receiving device. For example, if channel quality is improved, information to be transmitted from a transmitting communication device may be packed into larger packages. For a certain size of physical information, which may be the size of the information before being encoded and interleaved, a larger packet size may mean that physical information may be accommodated into a relatively small portion of a packet. A large packet size may also mean a higher throughput. In this way, according to embodiments of the invention, a receiving communication device may receive physical information before a whole packet may be received and, if decoding is successful, a positive HARQ may be sent to a transmitting communication device, which may indicate a termination of a transmission of a current packet. Once a transmitting communication device receives a positive HARQ, it may apply feedback in generating a next set of diversity control parameters.

In particular, since HARQ may serve as a channel quality indicator, a transmitting communication device, which may keep a record of a number of positive HARQ it has received, may compare the time that a positive HARQ is received against the time required for a transmission of a full packet. If an actual time is shorter than expected, it may mean that a previous adjustment made on diversity control parameters may have resulted in an improved throughput, and a transmitting communication device may maintain the same direction of parameter adjustment on a next set of diversity control parameters. A negative HARQ, or a positive HARQ that may arrive after a whole packet is transmitted, may indicate that a previous adjustment of diversity parameters may not have yielded desired performance improvement, and accordingly, changes may be made when generating new diversity parameters. A total number of positive HARQs or a ratio between positive and negative HARQs that may be received during a certain period of time may also be considered as a channel quality indicator in determining diversity control parameters.

In some embodiments, monitoring of HARQ for several frames may be used to indicate a depth and/or speed of a fading environment, and may assist other feedback mechanisms that may be operating, to set expectations for gradients, transients and other parameters.

Figure 1:
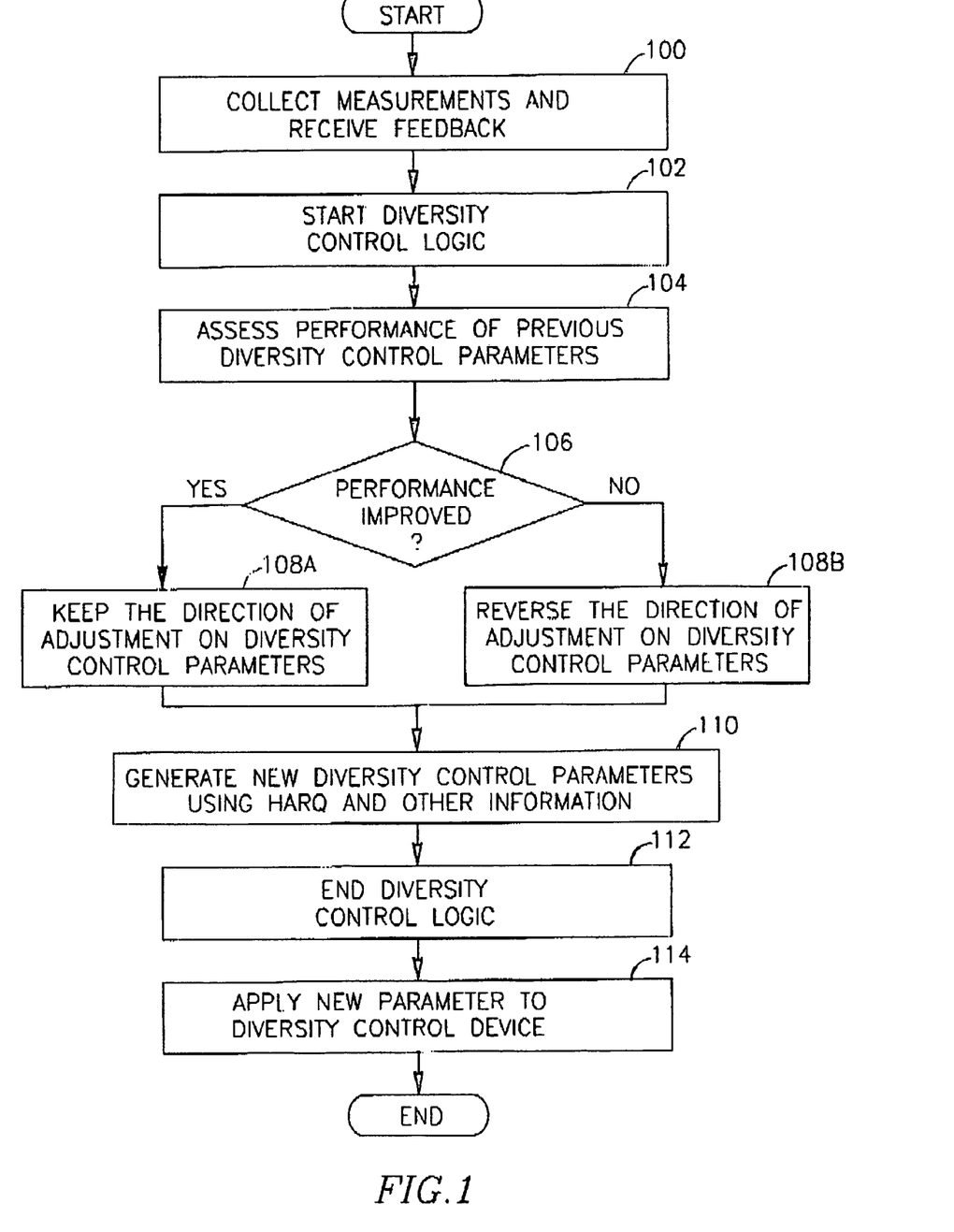
FIG. 1 depicts a schematic flowchart of a method according to an embodiment of the present invention.

FIG. 1 depicts a schematic flowchart of a method according to an embodiment of the present invention. According to the depicted method embodying the present invention, HARQ may be used in addition to other information in order to generate diversity control parameters. Other information may include power control feedback, an indication sent by a receiving device that power may need to be raised or reduced to achieve a defined received signal quality.

At step 100, transmit diversity control logic in a transmitting device may start to collect measurements and receive feedback from a receiving communication device. Measurements and feedback may include power levels at which signals are by a transmitting communication device and received HARQ bits. Additional parameters may include, for example, power control commands from a receiving communication device, data packet characteristics, or channel estimation parameters from reception of a signal transmitted from a receiving device to a transmitting device.

Diversity control logic may start at step 102 and may assess performance of a system based on a previous set of diversity control parameters at step 104. An assessment may assign weights to parameters in any of multiple ways, as explained below, and may determine whether a link has improved or degraded by a transmit diversity control based on a set of diversity control parameters. If an assessment indicates an improvement of system performance, a diversity control device may maintain a direction of an adjustment made on a previous set of diversity control parameters when generating new parameters, at step 108A. If system performance deteriorates, a diversity control device may reverse a direction of a parameter adjustment when generating a next set of diversity control parameters, as at step 108B. At step 110, a diversity control device may use information that may include HARQ and may generate a new set of diversity control parameters which may include amplitudes of transmitted signals, phases of transmitted signals, or complex weights which may include both amplitudes and phases. At step 114, diversity control parameters are applied to a transmitter.

Different algorithms may be applied as part of an assessment to determine how transmit diversity control parameters may need to be changed. According to one embodiment of the invention, HARQ bits may be used to make a decision when power control bits may not provide a clear indication. Another possibility may be to use HARQ as a separate, superimposed control loop that may add a diversity control change to a control that may be decided by other logic.

In an embodiment of the present invention, due to system delays, for example pipelining, a set of present parameters may be modified by a set of previous parameters that may be stored. These parameters may be used as performance comparison, and may include quality indicators, for example HARQ signals, or, for example, power control signals. These quality indicators may be used to determine, for example, a direction of a correction step to one or more transmit diversity control parameters. An initial, nominal correction step may also be determined using these quality indicators.

In an embodiment of the invention, a HARQ signal may be used as a quality indicator by a logic circuit as a first part of a decision criterion, and one or more quality indicators may be used as a second part of a decision criterion. A logic circuit may compare an indication from each decision criterion, and if they agree, a transmit diversity correction step may be increased, and if they disagree, a transmit diversity correction step may be decreased.

Figure 2:
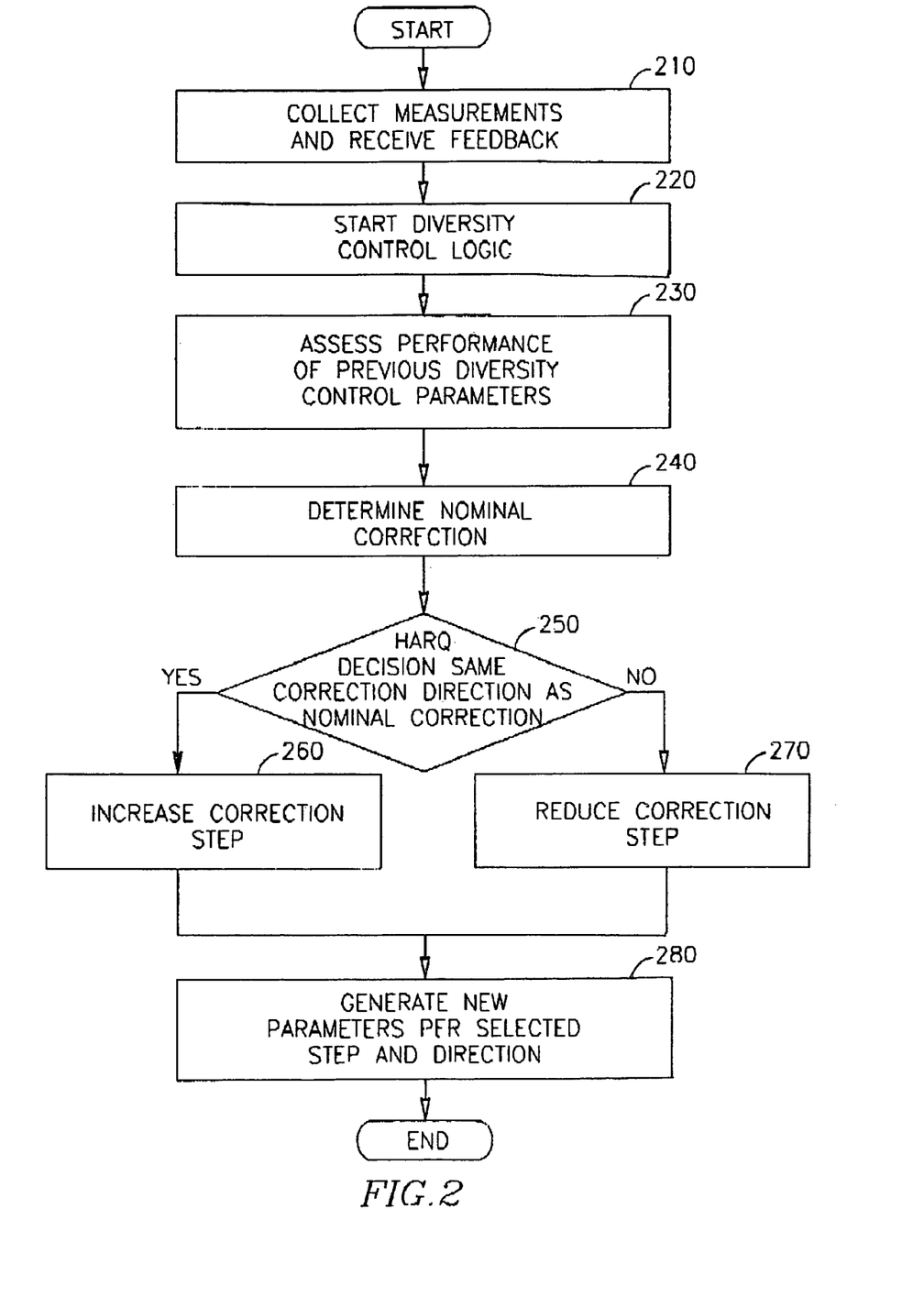
FIG. 2 depicts a schematic flowchart of a method according to an embodiment of the present invention.

FIG. 2 depicts an embodiment of the invention in which the logic output can make a decision and implements that decision. The decision has step and direction of the correction. If the HARQ logic agrees with the direction, the step is increased. If the HARQ logic points to the opposite direction, or disagrees with the direction, then the step is decreased or reduced. Thus, the other logic prevails in determining the direction, but the magnitude of the step is determined according to agreement or disagreement between that other logic and the HARQ information. This may be used, for example, when a communication error may occur, or when a logic output provides no decision.

At step 210, channel measurements may be made and feedback signals may be received by a mobile unit and/or a base station. At step 220, transmit diversity control logic may be implemented, and performance of parameters may be assessed at step 230, leading to step 240 where a nominal correction to diversity parameters may be established. A decision may be made at step 250 whether a HARQ signal that may be used as a quality indicator as a first part of a decision criterion, and one or more quality indicators that may be used as a second part of a decision criterion are in agreement as to how to apply a diversity correction. If they are in agreement, a diversity parameter correction may be applied with an increase in a parameter, at step 260. If they are not in agreement, a diversity parameter correction may be applied with a decrease in a parameter, at step 270. The new diversity control parameters may be generated and applied at step 280.

Figure 3:
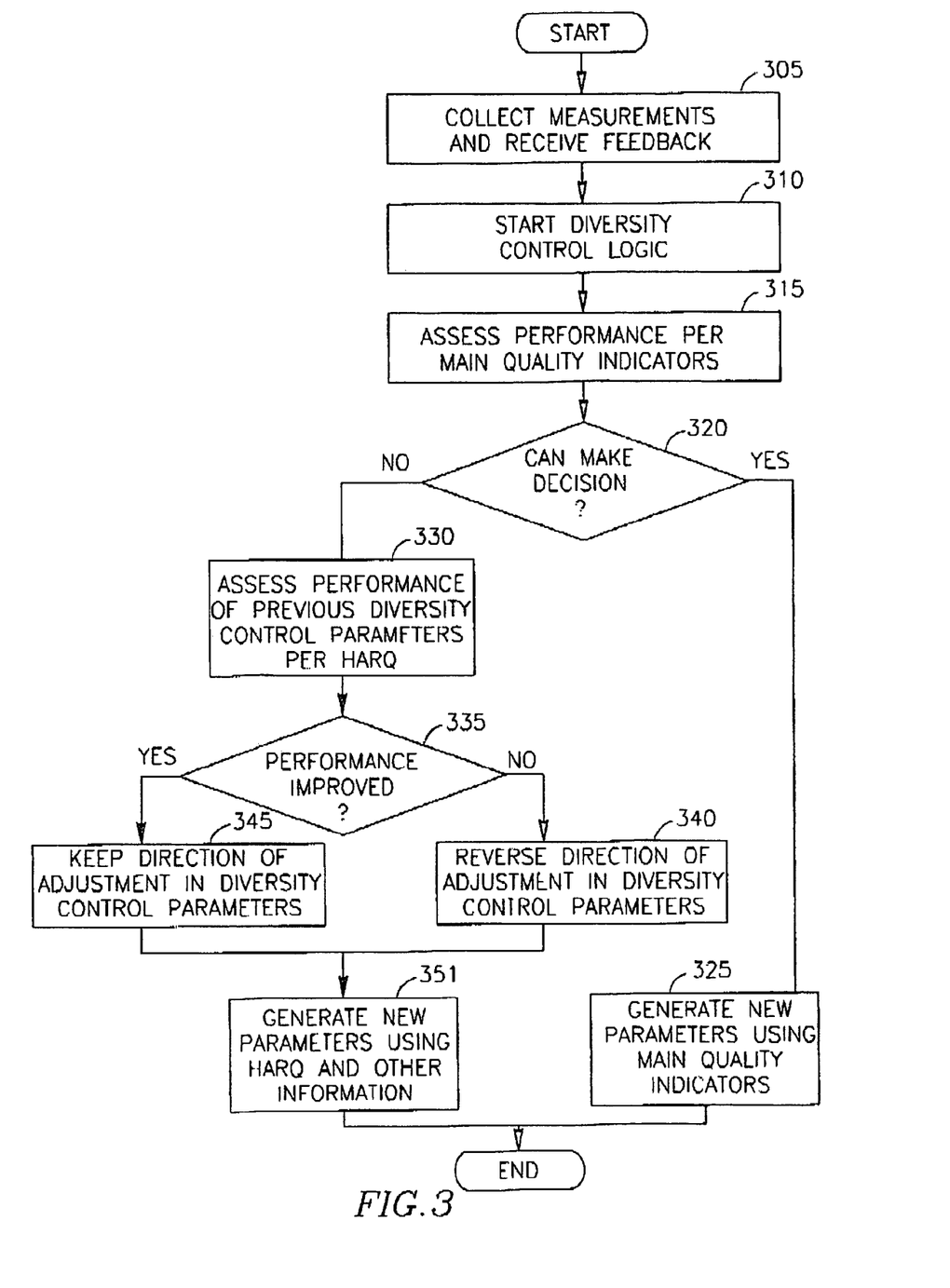
FIG. 3 depicts a schematic flowchart of a method according to an embodiment of the present invention.

Another embodiment of the present invention, depicted in FIG. 3, may determine whether a decision may be made based on quality indicators other than HARQ, before utilizing a HARQ quality indicator. At step 305, channel measurements may be made and feedback signals may be received by a mobile unit and/or a base station. At step 310, transmit diversity control logic may be implemented, and performance of quality indicator parameters may be assessed at step 315. At step 320, a decision may be made based on a quality of parameters other than HARQ signals, and may determine if a quality indication of a channel may be made from these parameters alone. If such a determination may be made, new control parameters may be generated at step 325 from quality indicators other than HARQ signals. If such a determination may not be made, HARQ signals may be used at step 330 to assess performance of previous diversity control parameters. At step 335, a decision may be made that may determine whether performance has improved. If performance has improved, at step 345 a direction of adjustment of diversity control parameters may be maintained. If performance has not improved, at step 340 a direction of adjustment of diversity control parameters may be reversed. After determining a direction of adjustment, new diversity control parameters may be generated at step 350, using HARQ signal information. Step 350 may also use one or more other quality indicators to generate new diversity control parameters.

In another embodiment of the present invention, a HARQ signal may be assigned a weighting factor that may be relative to other quality indicators that may be available. Each HARQ signal that may be received at a time t may be assigned a first weight factor, and other quality indicators may be assigned respective weight factors. A weight factor may be in a range from 0 to 1, or may be in another range. Considerations such as an importance of a quality indication parameter, a certainty of a value, and an amount of time that may have elapsed since reception. For example, a HARQ quality indicator may be computed as $W(HARQ(t))=W1 \times W2 \times W3$, where each of W1, W2 and W3 may be a second, third and fourth weight factor, that may be combined to form a first weight factor. Any number of weight factors may be combined to form a first weight factor. A first weight factor may be used to adjust a weight of a HARQ signal. W1 may be a second weight and an indicator of an importance of a HARQ signal, and may be relative to other quality indicators. For example, a HARQ quality indicator may be assigned a value that may be one-fifth of a weight value that may be assigned to a power control based quality indicator. W2 may be a third weight and may be a weight that may be assigned to a HARQ signal and may determine a relative threshold level as may be compared to other HARQ signals. Other HARQ signals may be stored for comparison. A third weight may be different for a positive acknowledgement signal (ACK) than for a negative acknowledgement signal (NACK), and may depend on one or more transmission conditions. For example, a first transmission may be a packet and may include information bits and error detection bits, and may not include error correction bits. In this example a HARQ may be a NACK signal and a HARQ threshold may be high. Further, in this example, an ACK signal may indicate a good quality and may be assigned a high weight value, and a NACK may indicate a lower quality, and may be assigned a low weight A NACK quality may still be sufficient enough to be usable in this case. W3 may be a fourth weight and may be a weight that may be assigned to a certainty of a HARQ indicator. A first HARQ bit may be received with a different level of certainty than a second HARQ bit and subsequent HARQ bits, and may have a different weight value. For example, a HARQ bit may be encoded as one of two sequences of N1 chips of a CDMA system. In this example, all received chips may correspond to one of two possible sequences, and a certainty of a value of a HARQ that may have been transmitted may be high, and a value that may be close to 1 may be assigned to weight W3. Further, In this example, if approximately half of bits that may correspond to a value are received, a decision may be uncertain and W3 may be assigned a lower value. Additional weighting schemes may be possible within the scope of this embodiment.

Figure 4:
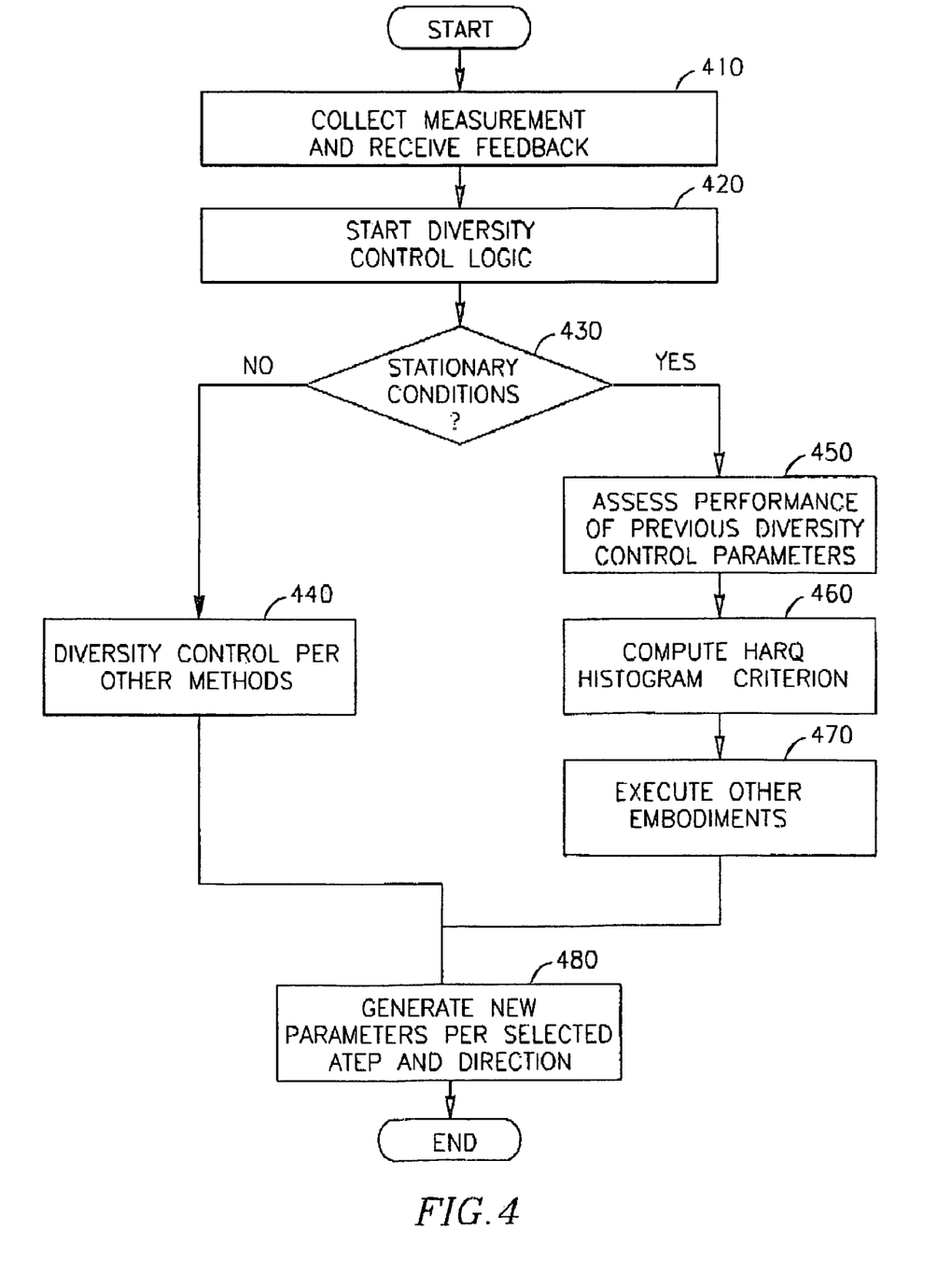
FIG. 4 depicts a schematic flowchart of a method according to an embodiment of the present invention.

Another embodiment of the present invention, depicted in FIG. 4, may be used under any conditions, however, the method may provide optimal results when used between a base station and a mobile station that is stationary, either permanently or temporarily. In some embodiments of the invention, it may be detected whether the mobile station is stationary, and if so, the method depicted in FIG. 4 may be selected. Propagation conditions between a stationary transmitter and receiver may be stationary with short-term variations, for example, due to passing vehicles, and other environmental factors. A transmitter may be truly stationary, for example a communication device may be attached to a vending machine, or it may be stationary for a temporary period of time, for example a mobile communication terminal in a stationary vehicle. A stationary condition may be identified by any means, for example, by analyzing communication conditions such as power variability and Doppler, or from an input of a Global Positioning System (GPS) receiver device. The determination of whether a mobile transmitter is stationary or moving may be made at the transmitting device, or at the receiving device, which may notify the transmitting device of such.

At step 410, channel measurements may be made and feedback signals may be received by a mobile unit and/or a base station. At step 420, transmit diversity control logic may be implemented. An assessment may be made at step 430 whether stationary conditions are present, and such assessment may be made by any of several methods, some of which that have been previously described. If conditions are found to not be stationary, diversity control may be implemented by means that may not include HARQ signals at step 440. If conditions are found to be stationary, HARQ signals may be used at step 450 to assess performance of previous diversity control parameters. At step 460, analysis of HARQ signals may provide a decision regarding performance of previous diversity control parameters, for example phase difference, and may be relative to HARQ quality indicators, and a criterion for this decision may be a HARQ histogram. A method of applying a histogram may be described by U.S. Ser. No. 11/228,428, hereby incorporated by reference, where diversity parameters, for example phase difference, may be grouped into virtual bins, and a decaying history of weights may be assigned to each of the bins. A received HARQ quality indicator may be determined to drive a diversity control parameter toward a probable value, as determined by a histogram, and a corresponding weight may be increased. Or, a received HARQ quality indicator may be determined to drive a diversity control parameter away from a probable value, as determined by a histogram, and a corresponding weight may be decreased. At step 470, diversity control may proceed as in steps 335, 340 and 345. New diversity parameters may be generated at step 480, as in step 280.

Furthermore, a class of algorithms may be used in which HARQ diversity control logic may correspond to Hybrid ARQ protocol as may be defined by a specific air interface standard. For air interfaces that may use systematic codes, pre-channel coding bits may be defined as original bits and added bits may be defined as error control bits. The algorithm defined herein may be applicable to air interfaces where HARQ logic may comprise transmitting first original data bits. A transmission block may be defined as a transmission of original bits and any additional transmissions that may be required for successful reception of these bits, whether repetition of these original bits or transmission of error control bits that may comprise channel coding for these original bits may occur. Hybrid ARQ feedback that may be provided by a receiver may consist of zero or more negative acknowledgements (NACKs), and may be followed by a single ACK in an event of a successful transmission. A failed transmission block may correspond to one or more NACKs with no ACK. The success ratio of any transmission that may comprise an integer number of transmission blocks may be defined as a ratio of a number of ACKs to a number of NACKs that may be provided as Hybrid ARQ receiver feedback to a transmission.

Two transmissions that may comprise an integer number of transmission blocks may be deemed to be transmitted with similar transmit parameters, if, for example, their transmit power and transmit data rate may be similar, or if, for example, their transmit power per data bit, that may not include a channel coding, may be similar. Similar may mean a difference between transmit parameters may be less than a threshold, or may be within a range.

One embodiment of an algorithm may consider a transmission of two blocks. If two blocks are transmitted with similar transmit parameters, a feedback HARQ sequence that may consist of N1 NACKs that may be followed by one ACK [N1×NACK ACK] may indicate better link conditions than a sequence that may consist of [N2×NACK ACK], where N1 may be less than N2. It may have a corresponding higher success ratio, and may correspond to $(1/N1)>(1/N2)$.

In an embodiment where processing of groups of multiple blocks that may have similar average transmit parameters, a group with a success ratio that may be as defined above may correspond to a better link condition. Transmit diversity control parameters may be modified in a direction from a present one to one that may be where a block may have a higher success ratio when it may be transmitted.

In some embodiments, transmit parameters may not be the same, and we may draw a conclusion of a transmission with a lower transmitted energy per bit has a higher success ratio. Since we expect a better transmit parameters, e.g. energy per data bit, may reflect in a better link, we may conclude that a link condition of a block with a lower average energy per data bit may be better and we may modify a transmit diversity control parameters in a direction from a present one to one with which a block with lower average energy per data bit may be transmitted.

In another embodiment of the present invention, a success ratio criterion may be defined as a secondary criterion, and may be combined with another primary criterion. For example, a primary criterion may be a power control logic, as may be described in any or a combination of U.S. Pat. No. 7,272,359 and US Patent Publications No. 2003/0002594, 2005/0130597, 2006/0270359, 2006/0267983, and 2007/0081607, all of which are assigned to the assignee of the present application, and which are incorporated herein by reference. In this embodiment of the invention, a correction step of a primary criterion may be increased if a direction of a correction according to this primary criterion may be a same direction as a direction of a correction according to a success ratio criterion, if it may be used as a primary criterion, as may be defined above. A correction step of a primary criterion may be reduced if a direction of a correction according to a success ratio criterion may be opposite to a direction that may be selected by a primary criterion.

In another embodiment, a success ratio criterion may be applied when other logic may fails to make a decision on a required correction. For example, if a primary criterion may be capable of making a decision on a correction of transmit diversity control parameters, it may be applied per its own logic. And, for example, if a primary criterion may fail to determine a required correction of transmit diversity control parameters, a correction may be applied per a Hybrid ARQ criterion as in a previous embodiment.

Another embodiment of the present invention may optimize a meaningfulness of a HARQ quality indicator, where this HARQ quality indicator may be applied as a part of any of the embodiments described herein. A HARQ quality indicator may be an ACK or a NACK, and may be assigned a value, or a weight. An ACK or a NACK may address a reception of a previous transmission, for example link conditions at a previous time. A value, or weight, that may be assigned to a HARQ quality indicator may be according to information that may be provided with regard to a link quality at a time that may correspond to this HARQ quality indicator. In one variation, a quality indicator may be assigned a value of, for example, good, or positive, for an ACK, or it may be assigned a value of bad, or negative, for a NACK. In another variation, a value may be assigned to a quality indicator when a quality indicator provides information. For example, if a value can only be a NACK, including a case where all bits may have been received with no errors, a quality indicator may not be assigned any value, and there may be different possible ways of addressing this situation. A first possibility may be to disable a HARQ criterion for diversity control, until a valid value may be assigned to a HARQ quality indicator. A second possibility may be to use a previous HARQ quality indicator, for example a last value of a preceding corresponding HARQ process. Corresponding HARQ processes may be previous HARQ processes that may have been transmitted with similar diversity control parameters. Other possibilities are possible within the scope of this embodiment. Another variation may be that a HARQ quality indicator may be assigned a value after all information bits of a systematic code may have been transmitted. A value may depend on a number of sub-packets that may be remaining. For example, the following table may list values of a quality indicator that may be stored.

| Remaining Packets | Value of ACK | Value of NACK |
|---|---|---|
| 0 | 0.2 | −1 |
| 1 | 0.5 | −0.8 |
| 2 | 0.8 | −0.5 |
| 3 | 1 | −0.2 |

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of communicating between a mobile communication device having a plurality of antenna elements and a base station via a communication link comprising:
   receiving a first quality indication signal from the base station;
   calculating a first complex weighting based on said first quality indication signal;
   selecting one complex weighting between said first complex weighting and a second complex weighting based at least in part on said first quality indication signal;
   modifying a pre-transmission signal based at least on the selected complex weighting to produce a plurality of modified pre-transmission signals;
   associating each of said plurality of modified pre-transmission signals with a respective antenna element of the plurality of antenna elements;
   sending from said mobile communication device said plurality of modified pre-transmission signals from said respective plurality of antenna elements, thereby forming a combined transmitted signal; and
   prior to receiving said first quality indication signal from the base station:
      receiving a second quality indication signal from the base station;
      calculating said second complex weighting based on said second quality indication signal; and
      storing said second complex weighting wherein said first quality indication signal is different from said second quality indication signal.

2. The method of claim 1, wherein said first quality indication signal is based on at least one hybrid automatic repeat-request (HARQ) signal.

3. The method of claim 1, wherein said second quality indication signal is a power control indicator.

4. The method of claim 1, wherein modifying said pre-transmission signal based at least on said selected complex weighting comprises modifying said pre-transmission signal with respect to at least one of a phase difference and a power ratio based on said selected complex weighting to produce said plurality of modified pre-transmission signals.

5. The method of claim 1, wherein modifying said pre-transmission signal comprises:
   modifying said pre-transmission signal in a first direction when the stored second complex weighting is selected; and
   modifying said pre-transmission signal in second direction opposite said first direction when the calculated first complex weighting is selected.

6. The method of claim 2, wherein said second quality indication signal is a power control indicator.

* * * * *